Sept. 24, 1929.  H. APPEL  1,728,951
GRAIN SPROUTER
Filed Aug. 18, 1927

Inventor
Henry Appel,
By G. C. Kennedy,
Attorney

Patented Sept. 24, 1929

1,728,951

UNITED STATES PATENT OFFICE

HENRY APPEL, OF WATERLOO, IOWA

GRAIN SPROUTER

Application filed August 18, 1927. Serial No. 213,851.

My invention relates to improvements in grain sprouters, and the object of my improvements is to perfect the operation of this class of devices, by providing means for requisite aeration of the grain therein while under treatment, and mechanism for delivering the sprouted grain from time to time.

Other objects will be more specifically alluded to as the description of the device proceeds.

Figure 1:
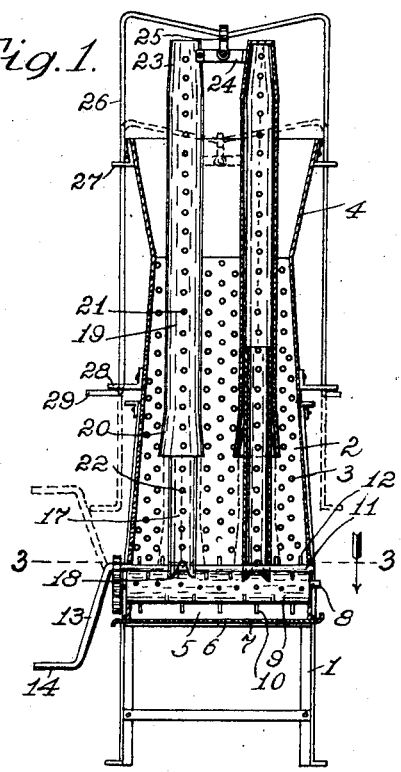
Figure 2:
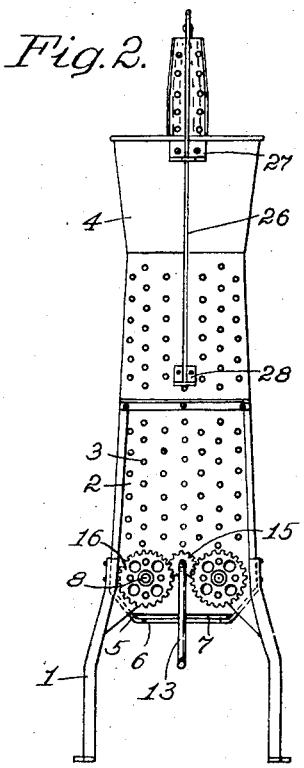
Figure 3:
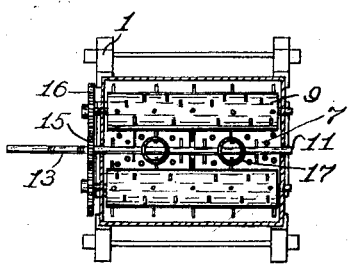

I have accomplished the above objects by the means and mechanism which are hereinafter described and claimed, and which are illustrated in the accompanying drawings, in which Fig. 1 is a medial vertical longitudinal section of my improved grain sprouter, and Fig. 2 is a front elevation thereof. Fig. 3 is a horizontal section of said device taken on the broken line 3—3 of said Fig. 1.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

My device comprises a hollow container 1 elongated upwardly and having at its upper end an outwardly flaring part 4 which serves essentially as a receiving hopper or funnel in which to deposit oats or other grain to be sprouted in the wall 2 of the main part 1. The main part 1 has numerous small holes 3 and is flared or expanded downwardly from the upper part 4 and terminates at its lower end in a downwardly diminished part 5 with sloping side walls and an open bottom 6, a pair of slide closures 7 being fitted in slideways to be in the same horizontal plane and to be moved to and from each other, both being provided with numerous drainage holes. A medial longitudinal shaft 11 is rotatably mounted in apertures in the front and rear walls of the body part 1 a short distance above the lower diminished part 5 and has its forward outer part bent into a crank 13, sloped forwardly and having a terminal handle 14. Without the container this shaft carries a small spur pinion 15.

Somewhat below the level of said shaft 11 a pair of longitudinally disposed rotary shafts 8 are likewise mounted in bearing openings in the front and rear end walls of the container spaced at equal distances laterally from the shaft 11 and carrying without the container like spur gears 16 in mesh with said spur pinion 15. The shaft 11 has a number of short radial pins or teeth 12 projecting from it therearound, while both shafts 8 carry fixedly drums 9 also having numerous radial teeth 10 therearound. The teeth on the shaft 11 and on the drums 9 are of a length to sweep terminally the intervening space, and the drum teeth also sweep terminally close to the inner wall of the container.

A pair of vertically disposed open ended tubes 17 are positioned medially longitudinally within the container body 1 vertically above said shaft 11. The sides of the lower ends of the tubes are notched at ninety degrees apart circumferentially, with the front and rear notches traversed by the shaft 11 which thus supports the tubes, while the side notches afford proper clearance therethrough for the teeth 10 of the drum alined therewith. The upper parts of the tubes 17 are mounted in the lower parts of larger and alined tubes 19 which latter are telescopically slidable on the tubes 17, and both sets of tubes have numerous small wall apertures for aeration purposes. The upper end parts 23 of the tubes 19 are closed and connected rigidly by means of a bar 24, so that these tube sections move together upon the tube sections 17. The lower end parts 20 of the upper sections 19 are slightly flared outwardly. An upwardly projecting loop or eye 25 is fixed medially on said bar 24 and receives the depressed middle part of a rod 26, which has at opposite front and rear sides of the container 1 downwardly bent vertical members passed slidingly through holes in brackets 27 and 28, the lower ends of the rods being bent outwardly as at 29 below the brackets 28.

The container 1 being empty, a charge of grain such as oats which has been previously well soaked in water is deposited together with the water in the container and filling the space below the drums 9 and the bottom closures 7, and also above the drum.

On the second and succeeding days thereafter, each day another charge of the soaked grain is deposited within the container upon the preceding layer, and until the container is filled. Usually, as constructed, the container is thus filled in four charges. On the fourth day, the bottom charge may be withdrawn from the container, the grain thereof being sprouted with sprouts from one quarter to one half an inch in length, the same being discharged when the bottom closures 7 are slid outwardly oppositely and the crank 13 rotated with the drums 9 to discharge the remainder of the first charge.

The flaring outwardly and downwardly of the walls of the container body below its upper part 4 is important, because as the grain descends when the lowermost charge is discharged in the manner above described, more room is given between the kernels for air and to provide for gradual swelling thereof with the extruded sprouts. The contents cannot become consolidated and without sufficient aeration. The first charge deposited in the container covers the lower parts of the lower tube sections 17 and the lower flared parts 20 of the upper sections 19. The succeeding charges gradually cover both tube sections until the container is filled. Then the operator draws upwardly the tube sections 19 while thus stirring the grain contents and loosening it with consequent enhanced aeration, and then lets the lower ends of said sections 19 rest upon the top of the whole contents. When the charges are thereafter successively withdrawn from below, the tube sections 19 sink with the upper level of the contents of the container, until the projecting terminal 29 of the forward rod member 26 is low enough to interfere with the crank 13 as indicated by dotted lines in Fig. 1, and this shows that the container needs refilling. The numerous aeration holes in said tube sections and the container walls give perfect aeration of the mass of grain inwardly and through it in all directions. The small holes in the bottom closures permit drainage of any surplus of water.

Having described my invention, what I claim as new and desire to secure by Letters Patent, is:

1. In a device of the character described, a hollow downwardly flaring container, having numerous wall orifices and open at both upper and lower ends, and a sectional aerating tube a section of which is mounted for vertical stages of adjustments upon another section within said container spaced from its inner walls and having numerous wall orifices.

2. In a device of the character described, a hollow downwardly flared container having numerous aerating wall orifices, a rotatable supporting and delivery device in the lower part of the container, and a hollow numerously apertured aerating body with telescoping sections supported for vertical stages of displacements within said container and spaced from its inner walls.

3. In a device of the character described, a hollow open end container, a removable closure for its lower open end, a load delivering basal means in the lower part of the container to support periodically deposited quantities of treated grain thereon, and a plurality of numerously apertured telescoping tubes supported within the container above said mechanism for aerating the surrounding contents with means for holding them in different stages of relative adjustments.

4. In a device of the character described, a hollow open end downwardly flaring container having numerous aerating wall apertures, means for releasably supporting sprouted grain thereon mounted within the lower part of the container, a plurality of telescopically connected numerously apertured sectional vertically disposed aerating tubes within said container, the lower sections only being relatively stationary, and means for telescoping and holding in stages successively said sectional tubes with the upper sections slidable upon the lower and relatively stationary tubes.

5. In a device of the character described, a container having an open top and a controllable bottom basal supporting delivery device, a sectional tube mounted vertically within the container and whose sections are telescopically connected and have small aeration holes in their walls, the lower section being relatively fixed and the upper section slidable upon the lower section, the upper section being rigidly connected to an arm projecting rigidly from it and bent downwardly at one side of the container, whereby the relative position of said arm indicates visibly the height of the contents of the container upon which the lower end of the upper section rests.

In testimony whereof I affix my signature.

HENRY APPEL.